INVENTOR
PHILIP A. STOWELL

BY  FRANK W. BARNES

AGENT

United States Patent Office 3,480,963
Patented Nov. 25, 1969

3,480,963
COMMAND RESPONSIVE MULTI-CHANNEL ELECTROSTATIC RECORDER
Philip A. Stowell, Paoli, Pa., assignor to Burroughs Corporation, Detroit, Mich., a corporation of Michigan
Filed July 27, 1965, Ser. No. 475,163
Int. Cl. G01d 15/06
U.S. Cl. 346—74                            6 Claims

ABSTRACT OF THE DISCLOSURE

A command responsive multi-channel electrostatic recorder which has N recording/erasing transducers, where N is an integer representing the number of channels, a common RF oscillator gatably connected to said transducers, a plurality of pulse print generators, one for each channel, individually connected to said transducers, electronic gating means arranged to respond to individual erase and print commands for applying said RF oscillation either individually or in combination with signals from said print pulse generators to selected transducers to deposit or erase information on a dielectric recording medium, an all channel erase transducer having a gated input from said RF oscillator when a total erase command is present and read-out means for sensing recorded information located collinearily with the recording/erasing transducers along the direction of travel with the recording medium.

---

This invention relates to electrostatic recording and, more specifically, to electrostatic recording apapratus and techniques having the option of erasing and/or non-destructive readout.

It has been well known in electrostatic recording to employ all or a part of the voltage used for driving charges to a recording surface, for initiating a spark discharge which provides a source for these charges. The use of this technique was limited since there was not a free choice of recording voltage, because reliable initiation of a discharge within the short time during which the discharge had to occur, required a fairly high voltage. Moreover, the construction of the printing transducer, which was preferably in the form of arrays of miniature spark gaps, proved to be complex and relatively costly. Finally, the transducer electrodes proved to be subject to erosion by the discharge, which changed their characteristics and could eventually render them inoperable. The operating reliability of simpler electrodes, which did not incorporate spark gaps at all, proved to be poor, and they required excessively high voltages in order to print.

Electronic circuitry has been developed by which a latent electrostatic charge pattern can be detected and read out non-destructively. This capability, plus the capability for recording such electrostatic charge patterns reliably and at will, would be applicable to the construction of a low cost memory, providing the third capability of being able to "erase" or discharge such charge patterns selectively, when desired, was also available.

These desired features have been accomplished by utilizing a spark gap printing transducer having its low impedance (bar) electrode biased to zero volts relative to the recording medium. The same complaints against this type of transducer which arose when it was used for recording also arose when it was used for selective erasing. When it was required that all the charges on a track of the dielectric be erased, it was necessary either to pulse the transducer once for each spot of charge when it was in perfect relationship with the spot, an impractical techniques to implement, or to pulse the transducer repeatedly at a high frequency so that the discharges would overlap and thus erase a continuous track. While initially effective, the latter techniques was found to exhaust very rapidly the useful lives of transducers so used; therefore, this technique also has been impractical.

It is, therefore, an object of this invention to provide an efficient technique for electrostatically recording and erasing discrete bits of information either continuously or selectively.

It is an additional object of this invention to improve existing techniques for erasing wide tracks of electrostatic recordings either continuously or selectively.

It is a further object of this invention to provide apparatus for recording information electrostatically having the option of erase and/or non-destructive readout.

It is a still further objective of this invention to improve existing techniques of electrostatic recording.

In carrying out the above-mentioned objectives, applicant's invention, a command responsive multi-channel electrostatic recorder, comprises N recording/erasing transducers wherein N is an integer representing the number of channels, a common RF oscillator gatably connected to said transducers, a plurality of print pulse generators, one for each channel, individually connected to said transducers, means responsive to individual erase and print commands for applying said RF oscillations either individually or in combination with signals from said print pulse generators to selected transducers to erase or deposit information on a dielectric recording medium, an all-channel erase transducer having a gated input from said RF oscillator when a total erase command is present and readout means for sensing recorded information located collinearly with the recording/erasing transducers along the direction of travel of the recording medium.

The novel features of the invention as well as the invention itself, both as to its organization and method of operation, will best be understood from the following description when read in connection with the accompanying drawings in which.

Figure 1:
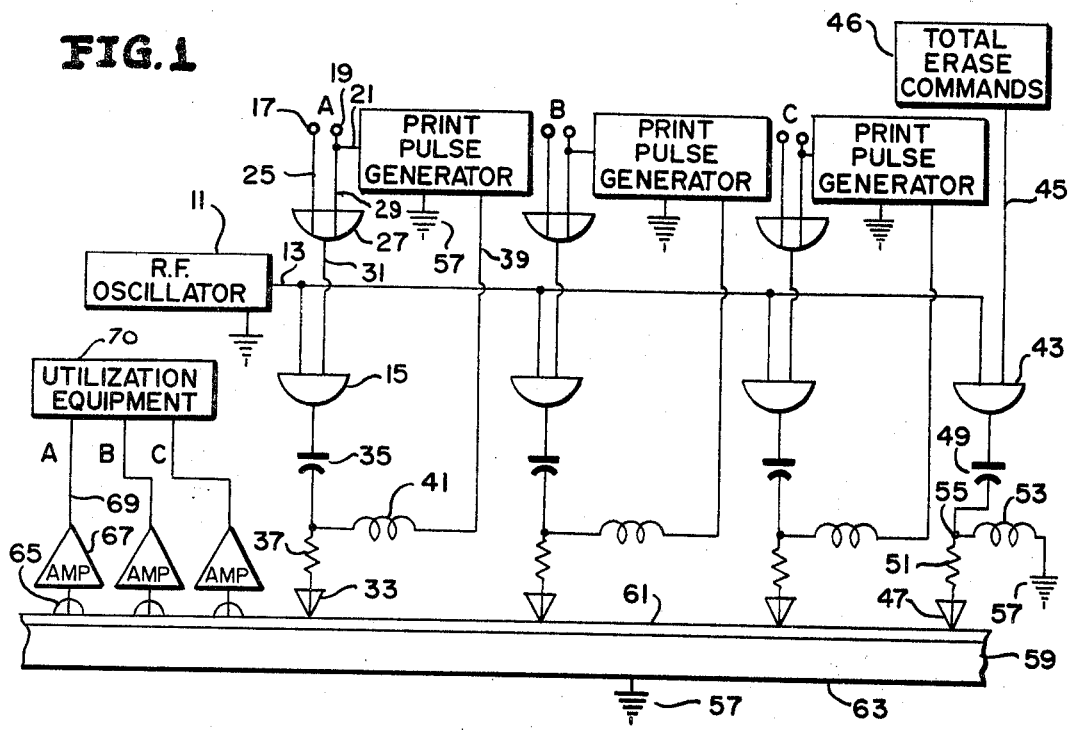
FIG. 1 is a schematic representation of applicant's electrostatic recording/erasing apparatus in a multi-channel configuration.

Applicant's invention is schematically illustrated in a three-channel electrostatic recording/erasing apparatus in FIG. 1. The channels, labeled A, B and C respectively, are identical and for purposes of clarity only one representative channel will be described.

An RF oscillator 11 is connected to a common bus 13 which has an output connected to AND gate 15. Individual erase and print commands from a source of initiating trigger pulses, such as the output from an electronic computer, are connected to erase and print terminals 17 and 19, respectively. Connection means 21 interconnects print terminal 19 and a print pulse generator 23. Erase connection means 25 interconnect erase terminal 17 and OR gate 27. Print connection means 29 interconnect print terminal 19 and said OR gate 27.

Output 31 from OR gate 27 is connected as the second input to AND gate 15. AND gate 15 is connected to recording/erasing transducer 33 by coupling capacitor 35 and limiting resistor 37. Transducer 33 may take the form of a matrix having small and/or sharp pin electrodes. Output 39 from print pulse generator 23 is also connected to recording/erasing transducer 33 through RF choke 41 and limiting resistor 37.

Common bus 13 is also connected as an input to AND gate 43. The second input to AND gate 43 is total erase terminal means 45 which interconnects AND gate 43 and a source 46 of total erase trigger pulses from a computer or the like.

AND gate 43 is connected to total erase transducer 47 by coupling capacitor 49 and limiting resistor 51. RF choke 53 interconnects terminal 55 between said coupling capacitor 49 and said limiting resistor 51 to a source of reference potential 57. Total erase transducer 47 may take the form of a knife edge or blade of sufficient length to span the width of a recording medium 59 or a substantial portion thereof as it is transversely moved beneath said transducer 47.

Recording medium 59 comprises a high dielectric film 61 and a conductive support 63. Conductive support 63 is connected by suitable means to the source of reference potential 57. Dielectric recording medium 59 is moved transversely beneath the transducers 47 and 33 by any suitable means, such as power driven rollers.

Shielded probe 65 is collinearly disposed in the direction of travel of the recording medium 59 and laterally displaced with respect to the edge of the recording medium 59 a distance equal to the displacement of recording/erasing transducer 33. Probe 65 is coupled to amplifier 67 which has an output 69 which may be connected to utilization equipment 70, such as the input of an electronic computer.

Applicant's technique may be utilized to digitally record and erase on both unbacked dielectric film and on dielectric film supported by an electric plated conductive member, such as conductive or conductive coated paper, metal tape or foil, a metal disc or drum or the like. Such recording may be made visible by the use of any well known process for applying electroscopic powder. The recording may be retained as a latent image to be read out subsequentlly by a charged sensing probe and electronic amplifier.

In operation, the RF oscillator 11 supplies RF energy to the various channels by the common bus 13. If either a print or erase command is applied via the erase or print terminals 17 and 19, respectively, to OR gate 27, an output pulse results which is coupled to the following AND gate 15. The RF from the common bus 13 is continuously present on the other input terminal of said AND gate 15, so when the pulse from OR gate 27 arrives, the previously qualified AND gate conducts and applies RF energy to the coupling capacitor 35. The AND gate 15 can be of any of the well known types, such as a gated RF amplifier.

The RF energy coupled through the capacitor 35 is applied to the recording/erasing transducer 33 through limiting resistor 37. If there is a bit of information in the form of a small spot of charge on the dielectric under the transducer, it will draw charge from the RF glow discharge and be discharged to zero volts, i.e., erased.

When an input print command is applied to terminal 19, it is also applied via connection means 21 to print pulse generator 23. Upon receipt of said print command, print pulse generator 23 puts out a DC biased pulse which may be in the range of 200 to 600 volts. This DC biased pulse is applied through RF choke 41 and limiting resistor 37 to the recording erasing transducer 33. The RF choke 41 presents a high impedance to the RF energy from the RF oscillator 11 and thereby prevents said energy from being coupled to and damaging said print pulse generator 23.

It will be appreciated that the channel in which recording or erasing is being conducted at any given instant is determined by the selection of the channel in which the initiating trigger pulses for these operations are fed.

When an initiating trigger pulse is applied to the total erase terminal means 45, AND gate 43 is thereby qualified and applies RF energy through coupling capacitor 49 and limiting resistor 51 to total erase transducer 47.

Depending upon the configuration of said transducer 47, that is to say, the relative width of the transducer with respect to the width of the dielectric, all or part of any charges on the dielectric are erased. It is anticipated that for most conditions where erasing is required, the duration of the RF discharge from the total erase transducer 47 would be very long compared to the duration of the RF discharge from any of the recording/erasing transducers.

When readout is desired, the electrically charged dielectric is moved beneath the shielded probe 65 which corresponds or is part of the same channel as the transducer 33. Shielded probe 65 is directly coupled to amplifier 67, which amplifies the level of the voltage induced on the probe by any electrostatically charged spot which passes beneath it on said dielectric surface. The output of amplifier 67 may be utilized as hereinabove described by any of several well known apparatus, such as electronic data processors.

Figure 2:
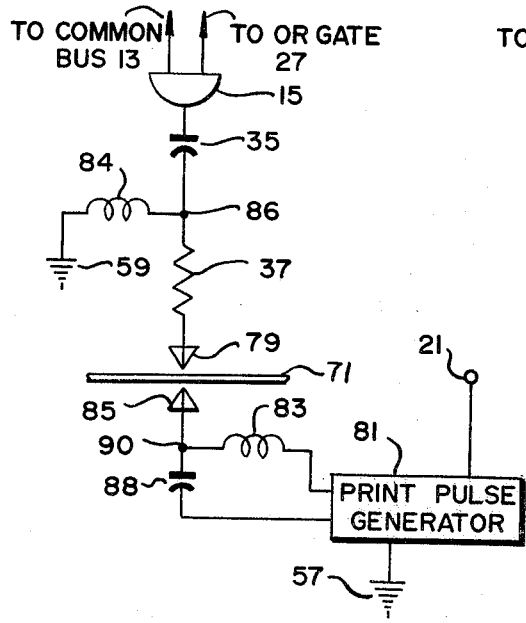
FIG. 2 is a schematic representation of one modification of applicant's invention.

As shown in FIG. 2, when there is no conductive backing on dielectric medium 71, the RF energy is applied via AND gate 15, coupling capacitor 35 and limiting resistor 37 to recording/erasing transducer 79 on one side of the dielectric 71 and the DC printing pulse being applied from print pulse generator 23 through RF choke 83 to a closely spaced mating electrode 85 on the other side of the dielectric medium. A second RF choke 84 interconnects terminal 86, located between coupling capacitor 35 and limiting resistor 37, and a source of reference potential 57. Coupling capacitor 88 interconnects terminal 90, which is located between electrode 85 and RF choke 83, and print pulse generator 81.

Figure 3:
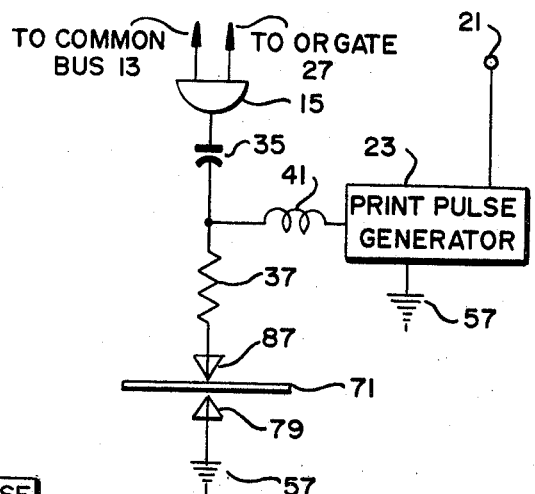
FIG. 3 is a schematic representation of a second modification of applicant's invention.

FIG. 3, which is a second modification of FIG. 1, also shows an unbacked dielectric medium 71 with the electrical connections to the recording/erasing transducer 33 the same as shown in FIG. 1. However, a second closely spaced mating electrode 89 is placed on the other side of the dielectric and is connected to a source of reference potential 57.

In the event that either of the two latter modifications is used for recording, static buildup on the dielectric film, unbacked by a conductive supporting member, may be objectinable unless steps are taken to control such static. Static control may consist of the well-known technique of utilizing a high voltage Corona ion generator over exposed sections of the dielectric to discharge monopolar static charges.

Applicant's combination of the non-destructive sensing and readout techniques with the technique of printing digitally from the plasma generated by the RF high voltage glow discharge in air initiated by the divergent RF electrical fields at the ends or edges of small and/or sharp electrodes, and the technique of selective or general erasing of latent images on the surface of a high dielectric film by RF discharges, constitute conjointly a useful method and apparatus which may be employed in conjunction with electronic digital computers and the like for the storing of digitally encoded "bits" of information. The technique and apparatus may also be used for storing digitally encoded information on tape, in a form distinct in principle from but analogous in function to such storage on punched paper tape, magnetic tape and the like.

While in this specification three modifications of applicant's invention have been described and the environment of the invention has been laid in a three-channel recorder, for clarity, it should be noted that the scope of this invention includes various changes and modifications that are within the skill of those familiar with the art.

What is claimed is:

1. A record/erase command responsive multi-channel device for depositing charge on a dielectric medium comprising
   a plurality of record/erase transducers, one for each of said channels, means for initiating record/erase signals in response to input commands, gating means for each of said transducers for applying said record/erase signals to said transducers, a source of oscillations for providing an RF output to each of said gating means, a plurality of print pulse bias generators, one for each of said channels, coupled to both said initiating means and said transducers for providing a bias output, means in series between said gating means and said transducers for presenting a low impedance to the RF output and a high impedance to the bias output, and means in series between said bias generators and said transducers for presenting a high impedance to the RF output and a low impedance to the bias output.

2. The device of claim 1 wherein said gating means includes an AND gated RF amplifier and said means for initiataing includes an OR gate.

3. The device of claim 1 additionally having a plurality of shielded pickup means for sensing charges on said dielectric medium, means connected to said pickup means for amplifying the sensed charge output produced by the pickup means, and means for transmitting the amplified output to utilization equipment.

4. A multi-channel electrostatic record/erase device comprising:

a plurality of primary record/erase conductors, one for each of said channels, a dielectric medium having said record/erase conductors positioned on one side thereof, at least one secondary record/erase conductor operatively associated with said primary conductors and positioned on the other side of said dielectric medium, a plurality of print pulse generators for individually supplying a bias to said primary conductors, means for producing a first signal and a second signal in response to a record/erase command, said second signal being coupled to selectively trigger said print pulse generators, a pulse source having an RF output, and means responsive to the presence of said first signal and said RF output for generating a record/erase drive signal to drive a selected one of said primary record/erase conductors.

5. The device of claim 1 having additionally a total erase transducer, and means responsive to a total erase command to gatably apply said RF oscillations to said total erase transducer for removing any residual electrostatic recording on said dielectric as said dielectric is moved beneath said total erase transducer.

6. A record/erase input responsive electrostatic device comprising means having a surface for storing a well defined area of electrostatic charge, a first record/erase conductor positioned adjacent one side of said surface, a second record/erase conductor positioned adjacent the other side of said surface, means for generating a record/erase selection signal in response to a record/erase input, a record bias generator operatively coupled to one of said record/erase conductors which generates an output in response to the record/erase selection signal, a signal switching means operatively associated with said first record/erase conductor for presenting a record/erase drive signal to said first conductor in response to an RF signal and the record/erase selection signal, and an RF signal generator for driving said signal switching means.

References Cited

UNITED STATES PATENTS

| | | | |
|---|---|---|---|
| 2,561,338 | 7/1951 | Camras | 179—100.2 |
| 2,872,529 | 2/1959 | Hollmann | 179—100.1 |
| 3,004,819 | 10/1961 | Anderson | 346—74 |
| 3,040,124 | 6/1962 | Camras | 346—74 |
| 3,185,995 | 5/1965 | Dickens | 340—173 |

BERNARD KONICK, Primary Examiner

LEE J. SCHROEDER, Assistant Examiner

U.S. Cl. X.R.

250—49.5; 340—173